UNITED STATES PATENT OFFICE.

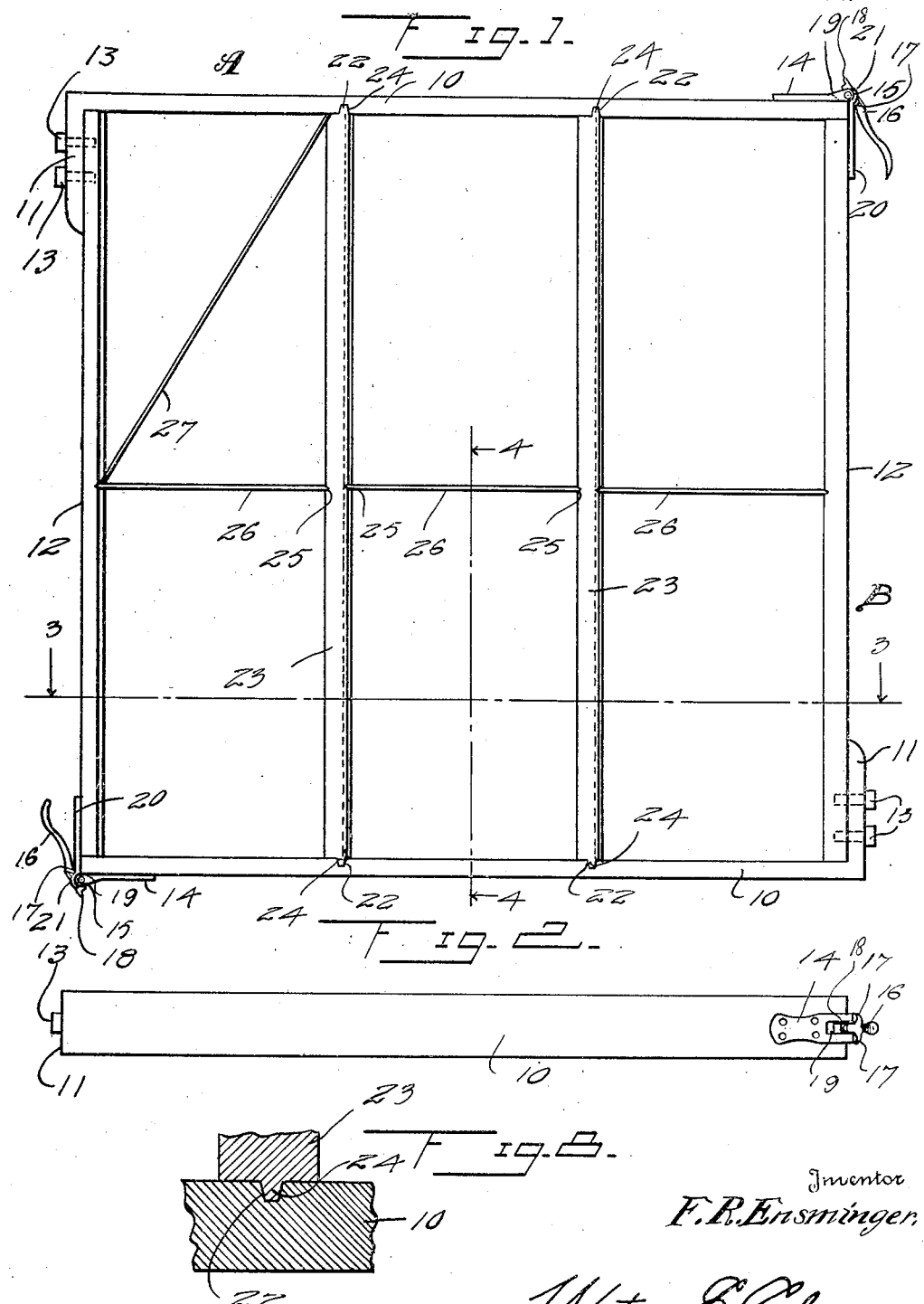

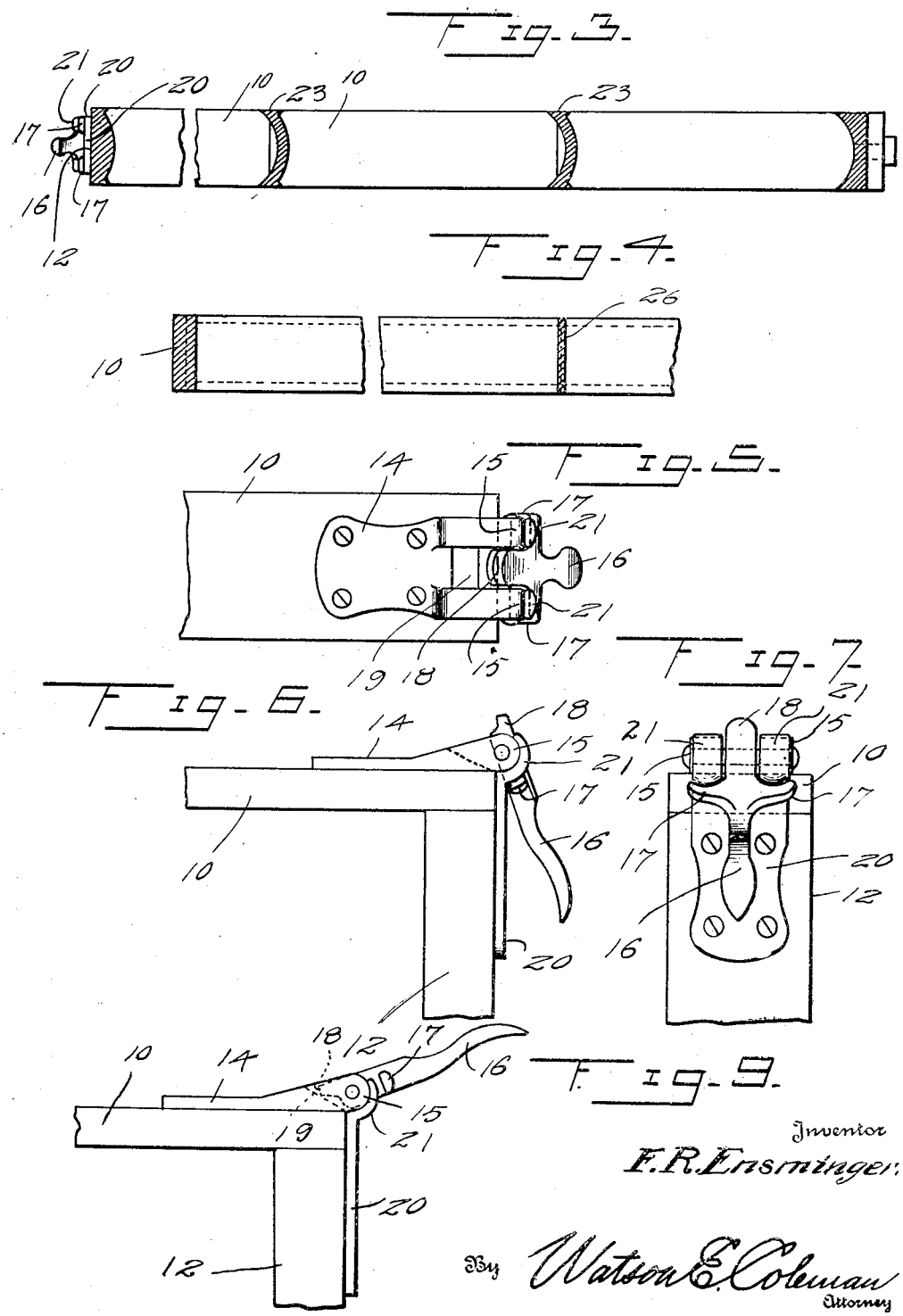

FRANK R. ENSMINGER, OF GILMAN, IOWA.

MOLD FOR MAKING SILO-STAVES.

1,354,543.     Specification of Letters Patent.     Patented Oct. 5, 1920.

Application filed September 8, 1919. Serial No. 322,312.

*To all whom it may concern:*

Be it known that I, FRANK R. ENSMINGER, a citizen of the United States, residing at Gilman, in the county of Marshall and State of Iowa, have invented certain new and useful Improvements in Molds for Making Silo-Staves, of which the following is a specification, reference being had to the accompanying drawings.

This invention relates to molds, and particularly to certain improvements on the silo stave mold forming the subject matter of Patent No. 1,199,877, granted October 3, 1916, to Willis L. Cutler.

The general object of the invention is to provide improved means whereby the side walls of the mold illustrated in said patent may be connected to each other at the corners of the mold so as to permit the ready attachment of the mold sections or walls or their ready engagement with each other.

A further object is to provide a latch at the corners of the mold sections whereby the two mold sections may be engaged with each other, the latch being so constructed that the two mold sections are held in proper rectangular relation.

A further object is to provide means whereby the mold spaces may be readily subdivided to form half staves or form staves having angular ends adapted to be used in the gable ends of buildings.

Other objects will appear in the course of the following description.

My invention is illustrated in the accompanying drawings, wherein:—

Figure 1 is a plan view of a silo stave mold constructed in accordance with my invention;

Fig. 2 is an end elevation of the mold structure shown in Fig. 1;

Fig. 3 is a section on the line 3—3 of Fig. 1;

Fig. 4 is a fragmentary section on the line 4—4 of Fig. 1;

Fig. 5 is a detail perspective view of the latch;

Fig. 6 is a top plan view of the latch;

Fig. 7 is an end elevation of the latch;

Fig. 8 is a fragmentary sectional view showing the joint between the members 23 and 10;

Fig. 9 is a like view to Fig. 6, but showing the latch released.

Referring to these drawings, it will be seen that my improved stave mold consists of two sections A and B, each of these sections comprising a longitudinally extending end wall 10 which is angularly extended, as at 11, at one end and attached to a longitudinally extending side wall 12 by means of screws 13. It will be seen that the side wall 12 bears firmly against the inside face of the angular portion 11 of the member 10 and is held in rectangular relation thereto. That end of the wall 12 which is opposite the attached wall 10 abuts firmly against the inside face of the opposite wall 10, and in order to hold these two mold sections together and hold the walls in proper rectangular relation while at the same time provide for hingedly connecting the sections to each other so that the sections may be swung away from each other or swung toward each other or provide for entirely detaching the sections from each other, I provide the hinge clips or fasteners illustrated in detail in Fig. 6. On the outside face of each section 10 there is applied a leaf 14 which is bifurcated to provide two ears or lugs 15. Between these ears is pivoted the latch 16 formed, in spaced relation to the pivot and provided toward the handle of the latch, with two laterally projecting lugs 17 and on the opposite side of the pivot and at the inner extremity of the latch with a longitudinally projecting lug 18.

It will be noticed that the inner wall of the space defined between the lugs 15 has an angular face 19, and when the latch is turned into an approximately parallel relation to the member 10, this tooth 18 or lug engages with the angular face. Mounted upon the wall 12 is a leaf 20 which extends beyond the end of the wall 12 and at its extremity is bifurcated and outwardly and forwardly curved to provide hooks 21, the outer and inner faces of these hooks being curved. When the wall 10 and wall 12 are brought together in rectangular relation, the ends of the lugs 15 will fit in the concavely curved faces of the hooks and then if the latch be turned into right angular relation to the plate or leaf 14, the lugs 17 will ride over the outer faces of the hooks. These outer faces are slightly eccentric to the pivotal center of the latch so that when the latch is turned down to the position shown in Fig. 6, the lugs 17 will bear against these eccentric faces of the hooks and will draw the parts toward each other.

Of course, it will be understood that this latch is duplicated at the opposite corner of the mold, and it will be noted that when the latches are fastened that the mold sections are held in locked, rectangular relation to each other and that the mold sections cannot, when the latches are locked, get out of this rectangular relation. When, however, a latch is drawn to the position shown in Fig. 9, the engagement of the lugs 18 with the hooks 21 is relieved and the two sections may be opened out or disengaged.

The inner faces of the walls 10 are vertically grooved, as at 22, and mold boards or walls 23 are adapted to be disposed longitudinally of the mold and have tongues 24 formed at their ends engaging in said grooves. These transversely extending partition walls or mold boards are preferably concavo-convex in cross section, as illustrated in Fig. 3, and as a consequence, the inner face of one of the walls 12 is concave while the inner face of the opposite wall 12 is convex, as illustrated in Fig. 3. Preferably, the walls 12 and the inner faces and the outer faces of the intermediate partitions or mold boards 23 are vertically grooved, as at 25, for the placing therein of intermediate partitions 26 of thin sheet metal. These are used for the formation of half staves. Diagonal partitions 27 may also be used, as illustrated in Fig. 1. These diagonal partitions are used for forming triangular stave sections which are designed for use in manufacturing staves for inclosing the gable ends of buildings. By omitting the dividing walls or mold boards 23 and, of course, the partitions 27, a door frame block can be cast with this mold, which overcomes the necessity of producing a special mold for the purpose.

It will be seen that the two right angular sections of the mold are provided with the snap fasteners or latches at their corners, and that when properly assembled, these two sections of the molds A and B form a perfectly rigid square which eliminates the possibility of their being any imperfection in the size or shape of the manufactured product. My device provides for a very quick means of connecting the mold sections to each other and disconnecting them from each other, which holds the mold sections rigidly in position, and which forms a hinge for the mold sections or a fastener and, therefore, materially assists in the rapidity with which the work is produced.

I claim:—

A mold of the character described including two sections disposed in rectangular relation, one of said sections having its end abutting against the other section, a leaf attached to the outer face of the last named section and having a pair of spaced lugs at its extremity projecting beyond the end of the section, a latch pivoted between said lugs and having a handle at one end and a projecting extension at the other adapted to bear against the leaf when the handle is turned into alinement therewith to thereby permit the handle to be used for opening the mold, the latch being provided with laterally projecting lugs spaced from the pivot of the latch, the other section having on its outer face a leaf extending beyond the end of that section and formed at its extremity with outwardly curved hooks adapted to bear against the ends of said lugs on the first named leaf, said hook being bifurcated to receive the latch, and the hook tapering from its base to its edge, the laterally projecting lugs on the latch engaging over the outer face of the hook and acting to draw the parts together.

In testimony whereof I hereunto affix my signature.

FRANK R. ENSMINGER.